Aug. 27, 1940.          P. CONRADSON                2,212,511
                         GRINDING GAUGE
                      Filed Aug. 1, 1938          3 Sheets-Sheet 3
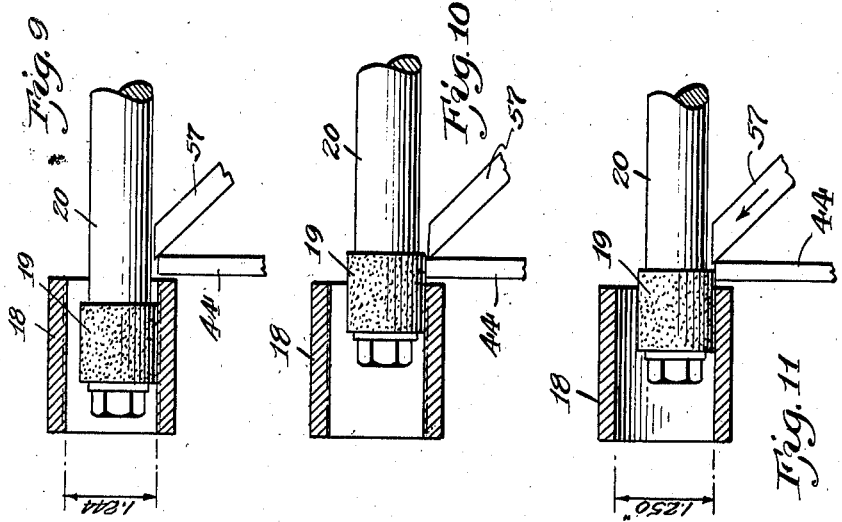
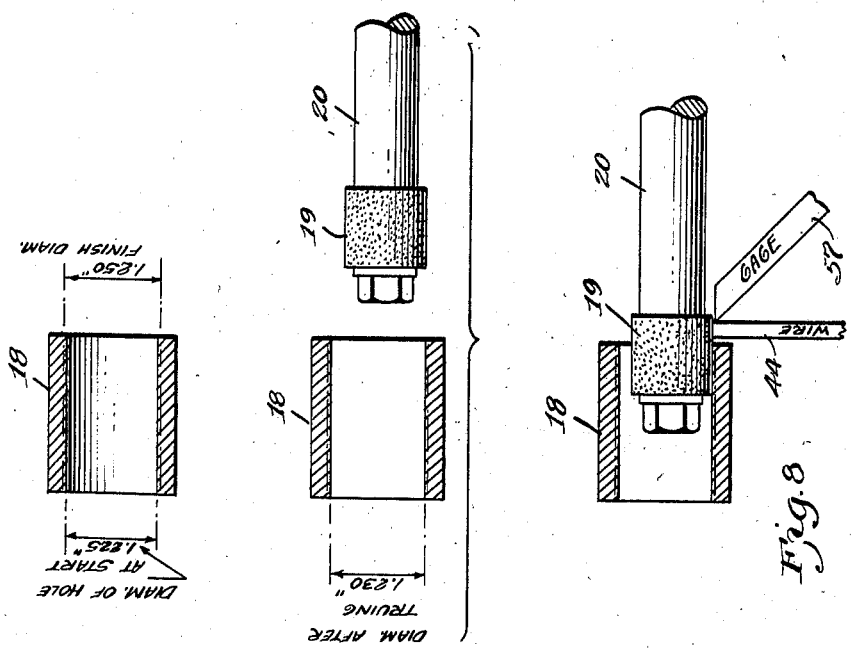
INVENTOR.
Prentice Conradson
BY
Barnes, Kisselle, Laughlin & Raisch
ATTORNEYS Patented Aug. 27, 1940

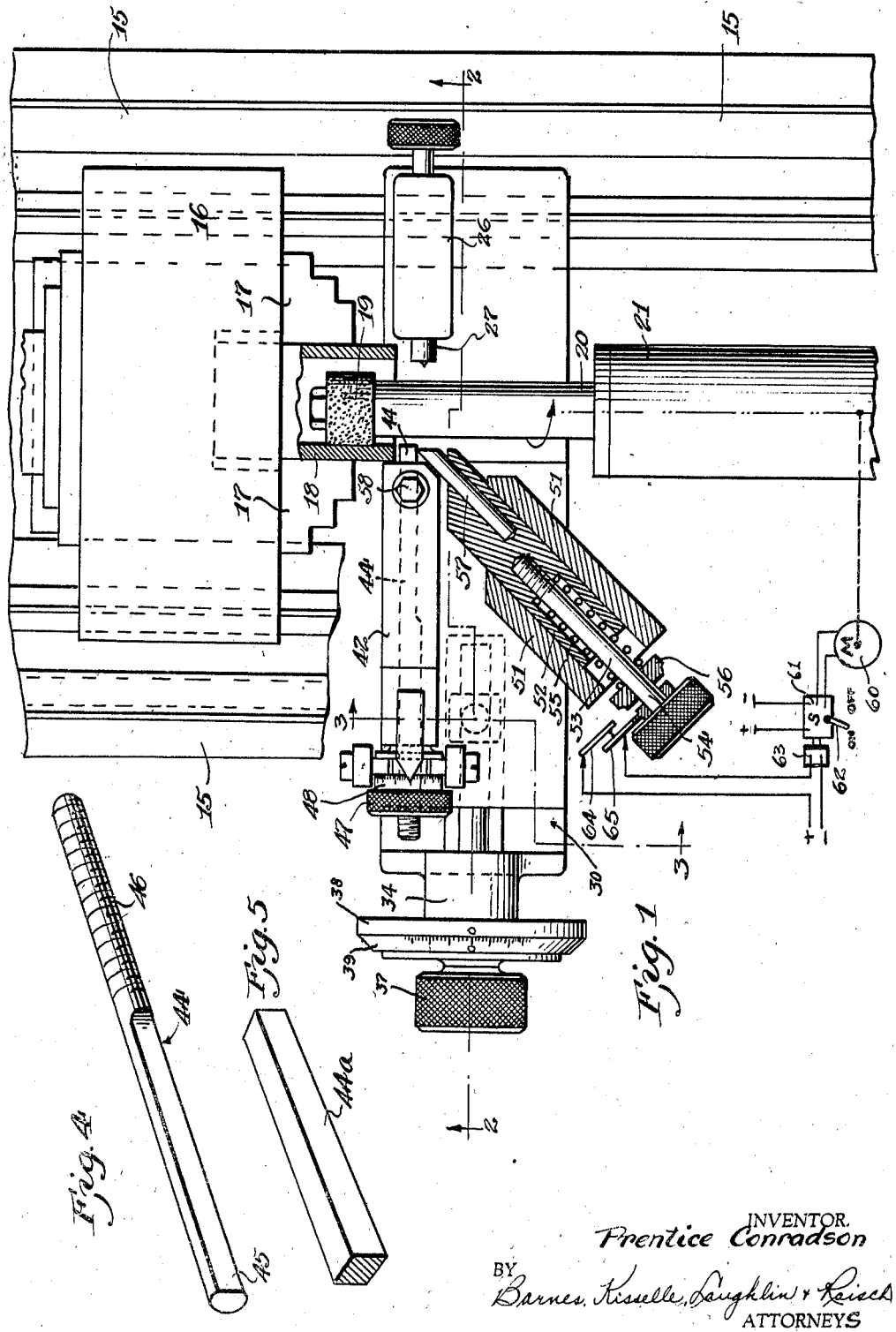

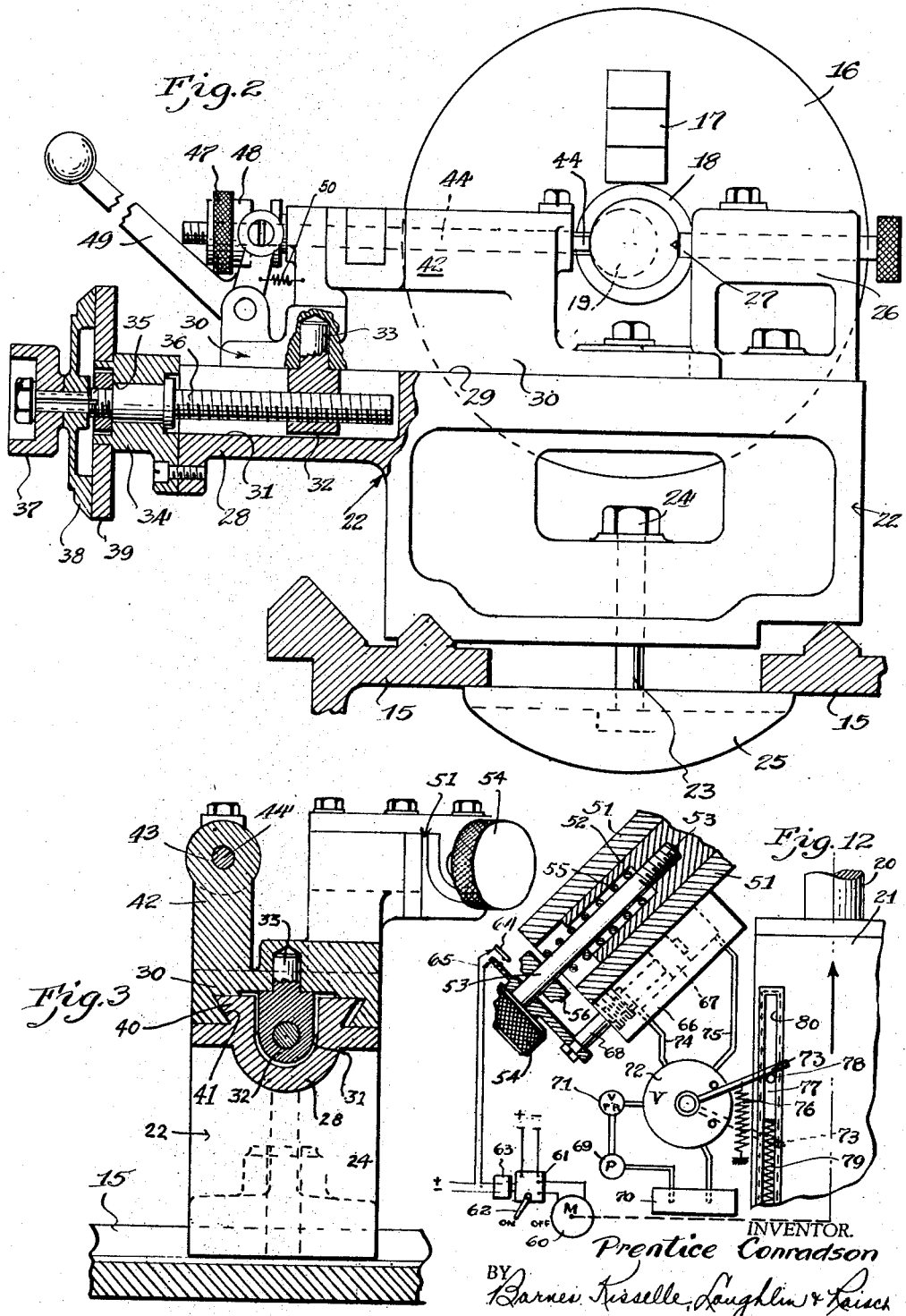

2,212,511

UNITED STATES PATENT OFFICE 2,212,511

GRINDING GAUGE

Prentice Conradson, Evansville, Wis., assignor to Conrad M. Conradson, Detroit, Mich.

Application August 1, 1938, Serial No. 222,348

17 Claims. (Cl. 51—165)

This invention relates to a method and apparatus for use in gauging production work on machine tools.

When extremely accurate production work is desired on machine tools, especially grinding machines, it is necessary to provide some type of gauge means for determining when the grinding process has cut the work to the proper dimensions. Numerous gauge devices have been developed for this type of work but none of them have proved satisfactory especially for the gauging of internal grinding operations. In some cases manual gauges have been utilized and in other cases automatic gauges. Of the automatic gauges, the plug gauge is a common type where a plug of the proper dimension is reciprocated behind the piece being ground, the gauge trying the hole for size each time the grinding wheel moves out of it. Another type of mechanical gauge has been the carbon washer type of gauge wherein a carbon washer is mounted with the grinding wheel and a ring mounted in the back end of the chuck behind the work. In this type of gauge the carbon washer wears down with the wheel and when it contacts the ring an electrical circuit is completed and thus indicating the hole to be the correct size.

The present invention contemplates a grinding gauge with which extremely accurate work is possible by reason of its unusual design. One object of the invention is to provide a sizer in which the gauge used need not come in actual contact with the work at any time.

Another object of the invention is to provide a gauge means including a part which is actually ground off by the grinding wheel simultaneously with the work and another part adapted to contact the first part until a certain predetermined portion is ground from the first part, at which time the gauge will indicate the completion of the work.

A further object of the invention has to do with the gauge means which may be utilized at each end of the stroke of the grinding wheel thus insuring that additional grinding will not take place after the proper dimension has been reached. An additional object of the invention has to do with a gauge means which may be operated automatically with the machine tool to stop the same when the grinding is completed.

Other objects and features of the invention having to do especially with details of construction and operation, will be further brought out in the following description and claims.

In the drawings:

Fig. 1 is a plan view of the gauging apparatus illustrating its use with an internal grinding machine.

Fig. 2 is a vertical section taken on the lines 2—2 of Fig. 1.

Fig. 3 is a front view of the gauging device, a portion being a sectional view taken on the lines 3—3 of Fig. 2.

Fig. 4 is a perspective view of a part of the gauging apparatus.

Fig. 5 is a view of a modified form of the part illustrated in Fig. 4.

Figs. 6 to 11 illustrate the method of gauging performed by the apparatus and a method of setting the same.

Fig. 12 is a partially diagrammatic view of a hydraulic and mechanical mechanism for providing automatic action on the gauging device.

Referring to Figs. 1 and 2, a horizontal slide for a grinding machine is shown at 15 and a chuck for the machine is shown at 16 having jaws 17 for gripping the work 18. The work 18 is a hollow cylindrical piece to be ground on its internal surface. A grinding wheel is shown at 19 on a shaft 20 which is rotatably mounted in a quill 21. A well-known mechanism (not shown) is utilized to reciprocate the quill 21 and the rotating shaft 20 so that the wheel 19 may be reciprocated in and out of the work 18.

Mounted on the horizontal slides 15 of the grinding machine is a frame or housing 22 shown to best advantage in Fig. 2. A bolt 23 in cooperation with a clamp nut 24 and a bar 25 holds the frame 22 positioned on the slides. At 26 is shown a small frame on the housing 22 for mounting a diamond pointed dressing tool 27. To the left of the frame 22 is an extension 28 which will be described in detail later. The top surface 29 of the housing 22 and the extension 28 are adapted to serve as a slide surface for an adjustment plate 30. In the extension 28 is an opening 31 in which a nut 32 is to slide. The nut 32 has a stud 33 projecting into and held by the adjustment plate 30. A portion 34 at the front of the extension is provided with an opening 35 for receiving a screw 36 which is threaded through the nut 32. The screw 36 is rigidly held in the portion 34 by retaining collars and an adjustment handle 37 is splined to the outer end thereof. A graduated disc 38 is also splined to the screw 36 and is held in place by the handle portion 37. It will thus be seen that turning the handle 37 will turn the disc 38 on a stationary ring portion 39 and will also move the adjustment plate 30 on the frame 22. In the section of Fig. 3 it will be seen that the top portion of the frame 22 and the extension 28 is provided with a dovetail portion 40 which slides in a dovetail slot 41 in the bottom surface of the adjustment plate 30.

We consider now the details of the adjustment plate 30. Extending along one side of the adjustment plate 30 is a housing 42 through the top of which is a small cylindrical bore 43. Slidably retained in this bore is a small rod or wire member 44 shown, in perspective, in Fig. 4. This rod may be called an indicating member and its function will be brought out in the description of the operation. The rod projects through the right end of the housing 42, as shown in Fig. 2, so that its end is positioned adjacent the work 18. This end of the rod is flattened as shown at 45 in Fig. 4. The other end of the rod is threaded at 46. The threaded portion of the rod is received by a threaded nut 47 which has a graduated portion 48. The turning of the nut 47 will thrust the rod 44 in or out of the housing 42. A bell-crank lever 49 is mounted on the adjustment plate 30 in such a manner that movement thereof will pull the rod 44 and the nut 47 out of the housing 42 without destroying the adjustment thereof. A spring 50 holds the bell-crank in the position shown in Fig. 2 when it is not being actuated. This bell-crank arrangement permits the wire 44 to be withdrawn to facilitate changing the work piece 18 without destroying the adjustment of the wire.

Referring now to Figs. 1 and 3, a housing 51 is shown mounted on the adjustment plate 30 on the side opposite the housing 42. Slidably mounted within this housing 51 is a plunger 52 from which extends a handle rod 53 on the end of which is a handle 54. A light spring 55 urges the plunger away from a stop piece 56 which is mounted on the housing 51. Projecting from the forward end of the plunger 52 is a gauge member 57 which is preferably provided with a diamond point.

The gauge wire 44 and the gauge member 57 preferably have their center lines lying in the same plane, which plane also includes the center line of the chuck 16 on the grinding machine. The housing 51 is at an angle to the housing 42, as shown especially in Fig. 1, so that when the wire 44 projects far enough toward the center of the grinder, the gauge member 57 will contact the same. The diamond point on the gauge member 57 has not been shown but is preferably spherical at its contact surface with the wire 44. The wire presents the flat surface 45 to the diamond point of the gauge 57. A lock bolt 58 serves to fasten the wire 44 rigidly in position so that the surface 45 is vertical.

In the operation: Assuming that Fig. 6 illustrates the work 18 before the central longitudinal opening therein has been trued, the first step is to chuck the work and grind the hole true. Assume that the internal diameter is 1.225 inches before truing and 1.230 inches after truing; the finished size is to be 1.250 inches. The wire 44 is now moved out toward the center of the lathe to a point where the gauge member 57 cannot pass the same, as shown in Figs. 1 and 8. This adjustment of wire 44 is accomplished by the turning of the nut 47. The adjustment plate 30 is now moved toward the work by turning of the handle 37, and grinding by the wheel 19 is again resumed. During the grinding, the gauge member 57 will be intermittently withdrawn as the wheel passes it to avoid injury thereof. It is moved back toward the wire 44 each time the grinding wheel passes to the work or away from the work to determine whether the gauge 57 will pass the wire 44. When the grinding is continued to a certain point, the gauge will pass the wire, as shown in Fig. 9. The grinding is stopped and the hole in the work 18 is measured and found to be .006 inch small. By the use of the micrometer disc 38 and the handle 37 the plate 30 is withdrawn from the center line of the lathe and a distance of one half of .006 inch or .003 inch. Also by the use of micrometer nut 47 the wire 44 is moved toward the center of the lathe .002 inch. Grinding is again resumed and the wire 44 tested intermittently as above described. The arrangement will then be as shown in Fig. 10. When the gauge passes the corner of the wire, as shown in Fig. 11, the correct size of 1.250 inches is reached. After this starting adjustment the micrometer disc 38 is left in the same position for the following grindings. The only adjustment that is necessary from now on is to move the wire 44 toward the work two thousandths of an inch, more or less, when a new piece of work 18 is placed in the chuck. In each case, as the work is ground down to the internal diameter of 1.250 inches, the gauge 57 will pass the end of the wire 44 thereby indicating that the grinding is finished.

The grinding wheel 19 is moved progressively toward the work transversely of the machine as is well-known. The reciprocation longitudinally of the machine has already been described. For the best work when the wheel is grinding on both the "in" and the "out" stroke, the gauge member should be moved toward the wire 44 just after the wheel 19 passes the wire going into the work in the direction shown by the arrow in Fig. 1, and just after the wheel 19 is retracted from the work and before it again starts its repeat stroke. In this way, if upon either the "in" or the "out" stroke, the proper dimension is reached, the wheel may be stopped so that the work will be exactly the right dimension. In the arrangement shown in Fig. 1, the gauge members are to be moved manually by pulling on the handle 54. The light spring 55 urges the plunger toward the wire 44.

In Fig. 1 is shown an automatic stopping arrangement. A motor 60 is shown diagrammatically connected to the quill 21. A switch 61 which may be actuated manually by a handle 62 or electrically by a solenoid 63, furnishes current to the motor. A switch consisting of two contact members 64 and 65 is shown adjacent the handle 54. The contact member 65 is mounted on the handle 54. When the gauge 57 passes the wire 44, its movement toward the wire will be limited by the stop 56. However, this slight movement will be sufficient to connect the contact members 64 and 65 so that solenoid 63 will be actuated to move the switch 61 to its "off" position thus stopping the motor 60 and the grinding machine.

In Fig. 12, I have illustrated a mechanism which may be utilized to actuate the plunger 52 so that the entire machine may be automatic. Assume that the wheel 19 is displaced transversely toward the work 18 only when the quill 21 completes its outward stroke. In other words, the wheel cuts only on its "in" stroke. A cylinder 66 is mounted on the housing 51 and a piston 67 reciprocates therein. A piston rod 68 is connected to the handle 54 so that movement of the plunger 52 will be simultaneous with that of the piston 67. A pump 69 drawing from a tank 70 and connected to a relief valve 71, furnishes pressure liquid to a valve 72. This valve 72 has an actuating handle 73 and is connected to the respective ends of the cylinder 66 by conduits 74 and 75. When the handle 73 is in the position shown in Fig. 12, pressure fluid will be passing through the conduits 74 to the lower end of the cylinder 66 thereby urging the piston 67 and the gauge 57 toward the wire 44. When the handle 73 is in the position shown by the dotted lines, pressure will pass from the pipe through the conduit 75 to retract the plunger 52. The relief valve 71 is an extremely light valve so that a pressure of only a few ounces will be exerted against the wire 44 by the gauge 57 when it is moved forward to contact the same. A spring 76 urges the handle 73 to its dotted line position. The actuation of the handle 73 is accomplished by a slide 77 mounted on the quill 21. A stud 78 on the slide 77 contacts the handle 73. A spring 79 urges the slide 77 to its position shown in the slot 80 in Fig. 12. The spring 79 is heavier than the spring 76. When the quill 21 is in its retracted position the valve handle 73 will be in the dotted line position and the plunger 52 will also be retracted. As the wheel 19 moves toward the work at the beginning of its stroke, the stud 78 moves the handle 73 against the pull of the spring 76. When the grinder is in the position shown in Fig. 1, the valve handle 73 is as shown in Fig. 12. Pressure fluid from pump 69 will pass through valve 72 to conduit 74 to move the plunger 52 forward so that the gauge 57 contacts the wire 44. As the quill 21 moves still further on its inward stroke, from the position shown in Fig. 1, spring 79 is compressed and the slide 77 is moved in the slot 80. As the quill starts its retraction stroke the spring 79 expands and when the wheel 19 reaches the position shown in Fig. 1, on its retraction stroke, the spring 76 acts on the valve handle 73 to move it to the dotted line position. Consequently, when the wheel 19 passes the wire 44, the gauge member 57 will be already retracted by pressure passing through the conduit 75. This operation is continued until on one of the forward strokes of the gauge 57 it passes the wire 44. At this time the contact members 64 and 65 will engage and the motor 60 will be stopped.

In some work, where extreme accuracy is desired, it is preferable to use a square wire 44a shown partially in Fig. 5. This square wire will have no tendency to turn in its bore and consequently will always present a vertical face to the gauge 57. It will be seen that the accuracy of the device on production work depends on the accuracy of the fitting of the plunger 52 in the housing 51, as well as in the accuracy of the contact surface of the gauge wire. The gauge wire is preferably hardened at least at its gauge end.

It should be understood that the term "indicating means" as used in the description and claims with reference to the wire 44, refers to any "indicating" or "feeler" member which is to be positioned adjacent, and cut with, the work.

What I claim is:

1. A gauge mechanism for use on a machine tool of the type having a reciprocating material removing tool and a means for holding a moving piece of work, comprising a stationary indicating means positioned on the machine whereby said tool, in its movement to and from the work, will contact said indicating means and the work and produce an equal effect on a surface of each, and a gauge means for indicating to an operator the point at which a predetermined amount of material is removed from said stationary indicating means.

2. A gauge mechanism for use on a machine tool of the type having a material removing tool and a means for holding the work, comprising an indicating means positioned on the machine whereby said tool will contact said indicating means and the work, and produce an equal effect on both, means for stopping said tool, and a gauge means operably connected with said stopping means and influenced by the presence of a material beyond a predetermined point on said indicating means whereby, when a predetermined amount of material is removed from said indicating means, said tool will be stopped.

3. A grinding gauge mechanism for use on a grinding machine of the type having a grinding wheel and a means for holding the work, comprising an indicating means fixedly positioned adjacent the work whereby a surface of said indicating means and said work will be ground with equal effect, and a gauge means influenced by the length of said indicating means, whereby when said fixed indicating means is ground to a predetermined point, said gauge means will shift to indicate completion of the grinding.

4. A grinding gauge mechanism for use on a grinding machine of the type having a reciprocating grinding wheel and a means for holding a moving work piece, comprising an indicating means positioned adjacent the work whereby a surface of the work and of the indicating means will be ground with equal effect, and a gauge means arranged to abut said indicating means at a predetermined point until said indicating means is ground a predetermined amount at which time said gauge means may pass said indicating means to indicate completion of the grinding.

5. A grinding gauge for indicating grinding distance on work, comprising an auxiliary member to be ground simultaneously with the work, and a gauge member adapted to contact the auxiliary member until said work is ground to a predetermined point, at which time said gauge member passes said auxiliary member thus indicating completion of the grinding.

6. A grinding gauge for indicating grinding distance on a work piece comprising an auxiliary member positioned adjacent said work piece and adapted to be ground simultaneously therewith, and an adjustable gauge member adapted to be moved to and from said auxiliary member to contact the same intermittently until said work is ground to a predetermined point, at which point said gauge member passes said auxiliary member thereby indicating completion of the grinding.

7. In combination with a grinding machine of the type having a work holder, a grinding wheel reciprocally mounted to pass to and from said work holder, and a grinding gauge device comprising a member to be ground simultaneously with the work, means on said machine for rigidly mounting said member adjacent the work in the path of said grinding wheel, whereby a surface of said member and of said work is ground with equal effect, a gauge means mounted on said machine adapted to be shifted to contact said member at a predetermined point, said point being the point at which said grinder is to be stopped, and means to permit manual shifting of said gauge means toward said member until said contact point is ground off from said member at which time said gauge may pass said member thus indicating a completion of the grinding.

8. In combination with a grinding machine of the type having a holder for the work, a grinding wheel, and a grinding gauge device comprising a member to be ground with the work, means on said machine for mounting said member whereby a predetermined portion will be ground by said wheel, and a gauge means mounted on said machine and adapted to contact said member at a point on said predetermined portion whereby movement of said gauge means in one direction is prevented until said grinding reaches a predetermined point when said gauge will so indicate by a relative movement between said gauge and said member.

9. In combination with a grinding machine of the type having a work holder, a grinding wheel reciprocally mounted to pass to and from work in said holder, and a grinding gauge device comprising a member to be ground simultaneously with the work, means on said machine for fixedly but adjustably mounting said member adjacent the work in the path of said grinding wheel, a gauge means, means on said machine for movably mounting said gauge means whereby said gauge means may be moved to contact with said member at a predetermined point, and means for actuating said gauge means to and from contact with said member at intervals in the stroke of said grinding wheel whereby when a predetermined portion of said member and said work is ground, said gauge means will so indicate by additional relative movement with said member.

10. In combination with a grinding machine of the type having a work holder, a grinding wheel reciprocally mounted to pass to and from said work in said holder, and a grinding gauge device comprising a member to be ground simultaneously with the work, means on said machine for fixedly but adjustably mounting said member adjacent the work in the path of said grinding wheel, a gauge means, means on said machine for movably mounting said gauge means whereby said gauge means may be moved to contact with said member at a predetermined point, and a mechanism responsive to movement of said grinding wheel for actuating said gauge means to and from contact with said member at intervals in the stroke of said grinding wheel whereby when a predetermined portion of said member and said work is ground, said gauge means will so indicate by additional relative movement with said member.

11. In combination with a grinding machine of the type having a work holder and a grinding wheel reciprocally mounted to pass to and from work in said holder, means for actuating said wheel, a grinding gauge device comprising a member to be ground simultaneously with the work, means on said machine for movably mounting said member adjacent the work in the path of the grinding wheel, a gauge means, means on said machine for movably mounting said gauge means whereby said gauge means may be moved to contact with said member at a predetermined point, control means operably connecting said wheel actuating means and said gauge means, whereby when a predetermined portion of said member and said work is ground, said gauge means will no longer contact said member and an additional relative movement thus permitted between said gauge means and said member will actuate said control means to cause stopping of said wheel actuating means.

12. In combination with a grinding machine of the type having a work holder and a grinding wheel reciprocally mounted to pass to and from work in said holder, means for actuating said wheel, a grinding gauge device comprising a housing mounted on said machine, an indicating member adjustably mounted in said housing and adapted to be ground with the work, a gauge member, means for movably mounting said gauge means to permit movement to and from said indicating member, and means on said housing for movably mounting said indicating member and said gauge member to permit simultaneous adjustment thereof, whereby the movement of said gauge member past said indicating member is normally blocked by said indicating member until said member and the work are ground a predetermined amount at which time said gauge slips past said indicating member to indicate completion of said grinding.

13. In combination with a grinding machine of the type having a work holder and a grinding wheel reciprocally mounted to pass to and from work in said holder, means for actuating said wheel, a grinding gauge device comprising a housing mounted on said machine, an indicating member adjustably mounted in said housing whereby it may be moved toward the working center line of said machine and adapted to be ground with the work, a gauge member mounted at an angle to, and having its centerline in a plane including the centerline of said indicating member, means for movably mounting said gauge means to permit movement to and from said indicating member, and means on said housing for movably mounting said indicating member and said gauge member to permit simultaneous adjustment thereof, whereby the movement of said gauge member past said indicating member is normally blocked by said indicating member until said member and the work are ground a predetermined amount at which time said gauge slips past said indicating member to indicate completion of said grinding.

14. The method of gauging a grinding operation on a grinding machine of the type having a moving work piece and a grinding wheel which moves to and from the work, which comprises placing an auxiliary fixed piece of material adjacent the rotating work, grinding one surface of the fixed piece simultaneously with a surface of the work upon each movement of the grinder, testing said auxiliary piece between movements of said wheel by utilizing a predetermined portion, adjacent the surface being ground, as an abutment for a gauge member, and stopping said grinding operation when said predetermined portion is ground to the point where it no longer serves as an abutment.

15. A gauge mechanism for use on a machine tool of the type having a reciprocating, material removing tool and a means for holding the work comprising a fixed indicating means positioned on the machine whereby said tool, during a portion of its stroke, will contact said indicating means as well as the work and produce an equal effect on a surface of each, and a gauge means comprising means directed toward said indicating means and normally blocked thereby but arranged to pass said indicating means upon the removal of a predetermined amount of material therefrom.

16. The method of accurately gauging a material removing operation of a machine tool which comprises placing an indicating piece of material adjacent a work piece, moving a machine tool to act with equal effect on said indicating piece and on said work, directing a gauge means toward a portion of said indicating piece adjacent the surface contacting the tool, and causing said gauge means to indicate the point at which a predetermined amount of material has been removed from said work and said indicating piece by movement of said gauge means past said indicating piece.

17. The method of accurately gauging a material removing operation of a machine tool which comprises placing an indicating piece of material adjacent a work piece, moving a machine tool to act on said indicating piece and on said work piece to produce an equal effect on both pieces during at least a portion of the material removing operation, directing a gauge means toward a portion of said indicating piece adjacent the surface contacting the tool, and causing said gauge means to indicate the point at which a predetermined amount of material has been removed from said pieces by movement of said gauge means past said indicating means.

PRENTICE CONRADSON.